United States Patent

Tran

(10) Patent No.: US 7,155,317 B1
(45) Date of Patent: Dec. 26, 2006

(54) OCCUPANT COUNTER CONTROL SWITCH FOR AUTOMATIC TURNING ON AND OFF ELECTRICAL APPLIANCES IN A ROOM

(76) Inventor: Nhan Tran, 10502 Kelly Lake Trail, Houston, TX (US) 77089

( * ) Notice: Subject to any disclaimer, the term of this patent is extended or adjusted under 35 U.S.C. 154(b) by 199 days.

(21) Appl. No.: 10/711,089

(22) Filed: Aug. 20, 2004

(51) Int. Cl.
*G05B 19/00* (2006.01)
(52) U.S. Cl. ............... 700/259; 307/117; 340/545.3
(58) Field of Classification Search ............ 340/541, 340/545.3, 565, 521, 522, 567; 348/154, 348/155, 143; 700/259, 11; 725/11, 12; 200/5 A, 329, 339; 307/117
See application file for complete search history.

(56) References Cited

U.S. PATENT DOCUMENTS

| | | | |
|---|---|---|---|
| 5,153,560 A | 10/1992 | Ichikawa | |
| 5,189,393 A | 2/1993 | Hu | |
| 5,374,854 A | 12/1994 | Chen | |
| 5,386,210 A | 1/1995 | Lee | |
| 5,473,202 A | 12/1995 | Mudge et al. | |
| 5,621,662 A * | 4/1997 | Humphries et al. | ......... 700/276 |
| 5,656,995 A | 8/1997 | Peters | |
| 5,903,217 A * | 5/1999 | Stanczak et al. | ............ 340/554 |
| 5,946,209 A | 8/1999 | Eckel et al. | |
| 6,151,529 A | 11/2000 | Batko | |
| 6,255,946 B1 * | 7/2001 | Kim | ............................ 340/556 |
| 2003/0227391 A1 * | 12/2003 | Beasley | ................... 340/693.6 |
| 2005/0043907 A1 * | 2/2005 | Eckel et al. | ................... 702/62 |
| 2005/0128067 A1 * | 6/2005 | Zakrewski | ................... 340/511 |
| 2005/0236906 A1 * | 10/2005 | Morgan et al. | ............. 307/117 |

* cited by examiner

*Primary Examiner*—Anthony Knight
*Assistant Examiner*—Jennifer L. Norton (57) ABSTRACT

A provided smart switch called Occupant Counter Control Switch, or OCCS, basically comprises of a motion sensor PIR, a photo sensor, an amplifier with band-pass filter, a microprocessor, a digital display, and a relay or triac to drive electrical appliances such as lights. The PIR sensor detects heat from a human body moving across it and generates a distinctive signal that is, unique to each of the two directions, further processed by the microprocessor for counting and thereby controlling the relay. Installed at the entrance of a room replacing the regular switch (see FIG. 1), the OCCS counts up, displaying a digit great than zero, upon detecting a person entering the room and turns on the lights if sensing insufficient ambient light. OCCS constantly energizes the lights during the room is occupied and immediately switches them off upon counting down to zero when detecting the last person exiting the room.

3 Claims, 8 Drawing Sheets

OCCUPANT COUNTER CONTROL SWITCH FOR AUTOMATIC TURNING ON AND OFF ELECTRICAL APPLIANCES IN A ROOM

BACKGROUND OF INVENTION

The present invention pertains to automatic switches for controlling electrical appliances. Particularly, it is a smart switch called Occupant Counter Control Switch, or OCCS, which automatically turns on and off electrical appliances such as lights by capable of keeping track and displaying the number of occupants in a room via the process of counting up when detecting a person entering the room and counting down when detecting a person leaving the room. When the display shows the count number greater than zero, indicating the presence of occupant/occupants in the room, and insufficient ambient light is detected, the OCCS turns on the lights and constantly keeps them on as long as the room is occupied. When the count or display reaches zero as the last person exiting the room, the OCCS immediately turns off the lights.

With today high price of energy and air pollution are concerned, a smart switch such as OCCS will help saving energy in every household and will consequently help keeping the earth atmosphere less polluted. It will be very useful for the families having teenagers who tend to be careless about turning off the lights after leaving the room, or for the families having young children who, are not tall enough to reach the switch, need help from the adults to turn on or off the lights every time they entering or leaving a room. OCCS will automatically take care of turning on and off the lights for them. Parents will no longer concern of any light be left on unintentionally in the house to waste power and to generate heat that keeps air conditioning to run excessively to waste even more energy. Thereby, the present invention OCCS devotes to save energy and to offer convenience in daily life.

Most of the automatic switches in the prior arts, such as the U.S. Pat. No. 5,946,209, simply turn on the lights for a preset period of time when detecting a person's movement in the motion-detection zone of the PIR sensor. When the preset time expires, the lights are turned off until the PIR sensor detects another human motion to turn on the lights again for another preset time period. This becomes very annoying when a person in a room sits almost motionless during the time he/she reading the book and the lights suddenly turns off upon timing out. If prolong the preset time for the possibility of the PIR sensor to detect another human motion before time out, the lights will stay on too long a period of time from the moment the room is unoccupied; therefore, energy is wasted. Moreover, this mentioned prior art is not very useful for application in a room that has partitioned wall or object blocking the view of the PIR sensor.

Other prior invention, U.S. Pat. No. 5,374,854, offered some similar functions to those of the present invention OCCS but did not provide a means to allow manually change the count value and a means to display the figure of the count value. This becomes ambiguous when the automatic switch of this said prior art miscounts, caused by human, and there is no means for recognizing the erroneousness; for example, when a person inadvertently stands in front of the sensor for a conversation with someone and his movements mislead the automatic switch to count up or count down excessively. The result of these excessive counts would unexpectedly turn off the lights and would be very inconvenient for the occupants who had to get out of and then reenter into the room to restart a new count cycle for turning on the lights properly. For a quick solution, someone would have certainly depressed the provided button on this said prior art to manually turn on the lights instead; however, this solution defeats the purpose of having a switch operates automatically since the last person who leaving the room has to manually turn off the lights. But more than likely that no one minds to turn off the lights because no one knows for sure that he/she is the last person in the room. With the OCCS, someone just enters the correct number of occupants and the OCCS takes care of turning off the lights automatically upon the last person exiting the room.

To overcome the mentioned problems and to make ease of use, the preferred embodiment of the present invention OCCS provides the means to display the figure of the count that indicates the number of occupants in the room and the means to allow manually adjusting the count value; therefore, the user can visually acknowledge the erroneousness, accidentally caused by the user, and be able to easily correct the count by pressing the button on the OCCS. The provided digital display also associated with the provided two push buttons to serve other functions of fine-tuning. With the intention of saving energy, the said digital display is programmed such that no more than one segment of the digit is flashed at any time. Each segment of the digit is flashed quickly and sequentially making the whole digit appears solidly illuminated.

Figure 1:
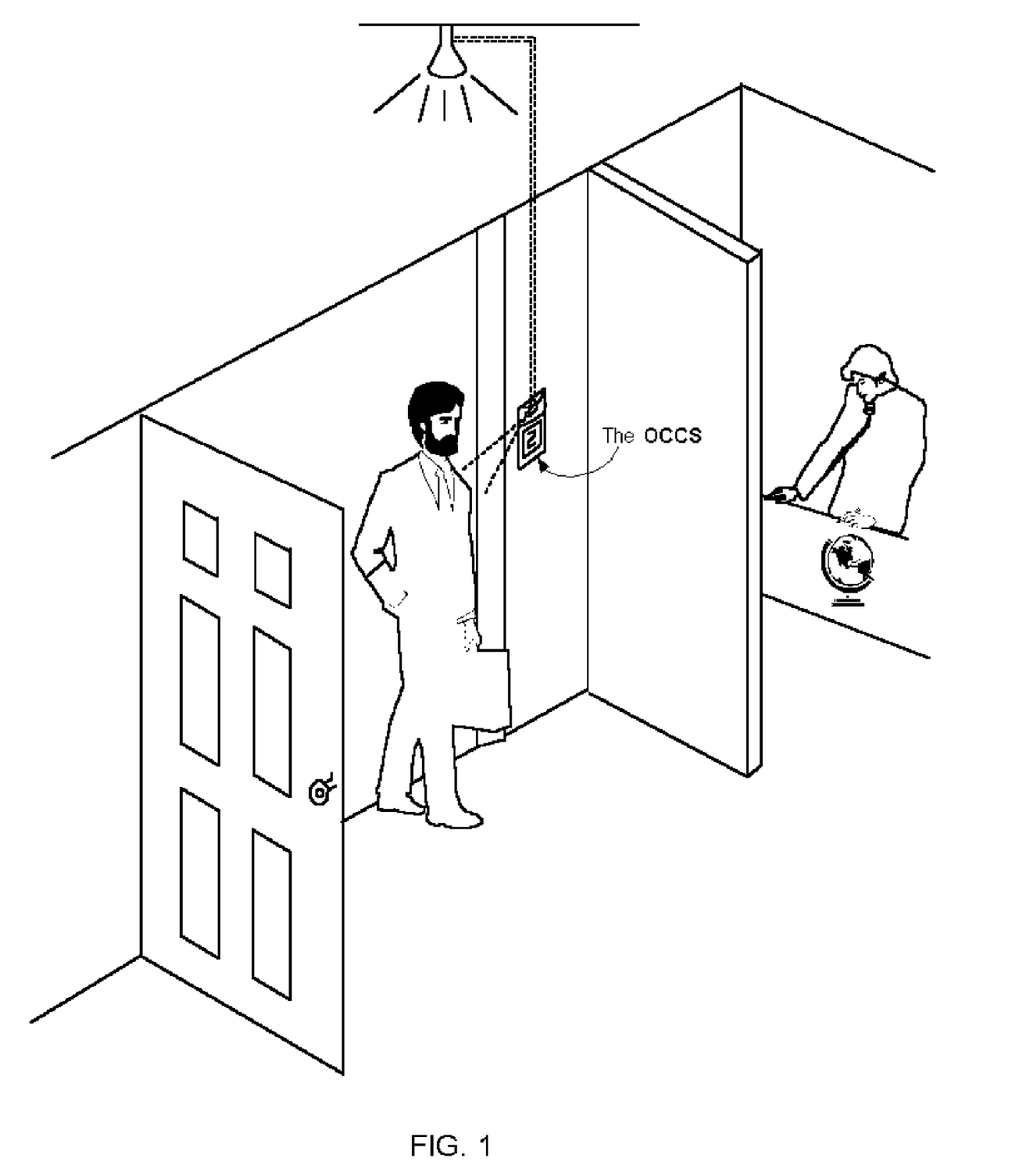
FIG. 1 shows the OCCS (Occupant Counter Control Switch) mounted at the entrance of the main room that contains a partitioned room. The OCCS has automatically turned on the light since detecting the first person (the lady speaking on the phone behind the partitioned wall) walked into the room. The OCCS displays a number "2" as it detects the second person (the man) entering the room and it constantly keeps the light on as long as the room is occupied.

Another reason for this invention is of its economical benefit. Only one OCCS needed at the entrance of the main room that contains several partitioned rooms that share the same light source (see FIG. 1), whereas the mentioned automatic switch of the prior art, whose sensor's view is blocked by the partitioned walls, must be installed in every partitioned room to control its own light source.

SUMMARY OF INVENTION

Figure 5A:
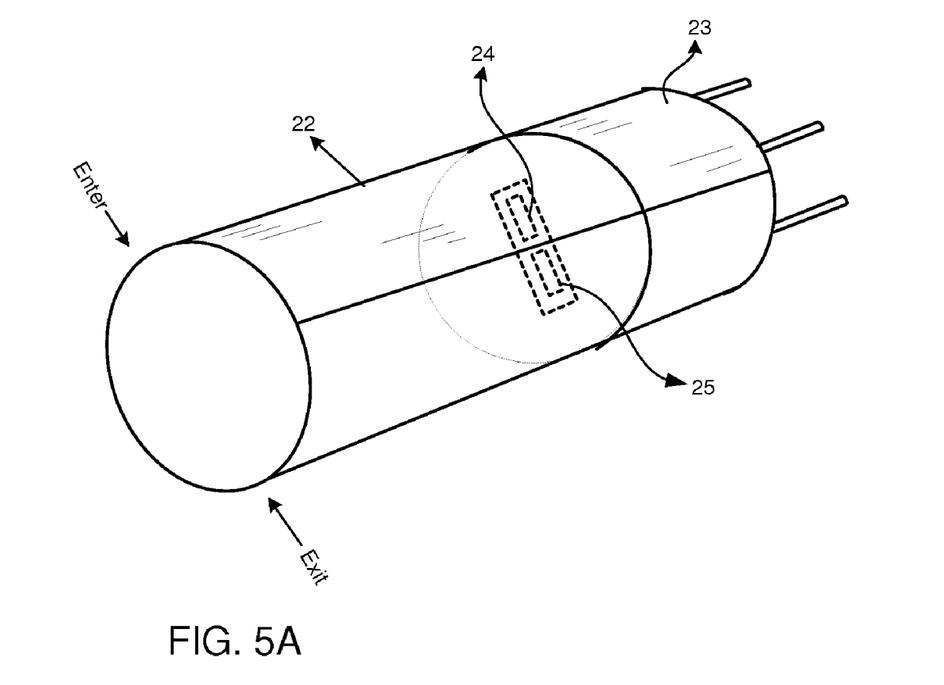
FIG. 5A shows the PIR sensor being encapsulated in a cylinder tube to narrow its detection angle. The figure consists of: 22_the restrict-vision tube; 23_the PIR sensor body; 24_the Exit element sensor; 25_the Enter element sensor.

The object of the present invention is to provide a smart switch that turns on and off electrical appliances such as lights in a room automatically by intelligently keeping track the number of occupants in a room via the process of counting up or counting down upon detecting a person entering or exiting the room respectively. The present invention smart switch called Occupant Counter Control Switch, or OCCS for short, comprises of 24VDC and 5VDC power supplies (see FIG. 3), a PIR human motion detector with vision restricted (see FIG. 5), a photo sensor, an amplifier with band-pass filter circuit, a microprocessor, a digital display, a relay or triac to drive electrical appliances, and two push buttons: one for manually turning on and off the said relay and one for manually increasing or decreasing the count shown on the said display. Besides its main function of displaying the digit of the count number of occupants in the room, the said digital display also associates with the said two push buttons to serve other purposes such as for manually adjusting PIR sensor threshold, adjusting ambient light referent level, and activating sleep mode. The said vision-restricted PIR motion detector of the OCCS is assembled in such a way that allowing it to be adjusted freely to aim at any direction so that the OCCS can be mounted either on the right side or left side of the entrance of the room or can be aimed down to detect children.

To achieve the benefit of saving energy and offering convenience in daily life, OCCS is invented to operate in its own way that sets it apart from other automatic switches available in the market. Unlike the previous inventions of the prior arts, such as the U.S. Pat. Nos. 5,946,209 and 5,656,995, which turn off the lights unexpectedly upon the preset time expires while the room is occupied and do not turn off the lights until the preset time expires since the moment the room is unoccupied, the nature operation of the OCCS allows it to constantly keep the lights on as long as the room is occupied and to instantly switch off the lights upon the last person leaving the room. OCCS also provides a feature of sleep mode that is another convenience for the user when it is installed in the bedroom.

Comparing with the prior art U.S. Pat. No. 5,374,854, which offered similar functions to those of the OCCS, the present invention OCCS is more advanced in a way that it provides a digital display to show the count of the number of persons in a room and also provides the user a means for easily change the count value when the user accidentally causes the device, OCCS, to miscount that interrupts the lights. The present invention OCCS is simpler to build and less expensive; therefore, it will be more affordable for the public.

DETAILED DESCRIPTION

Figure 2A:
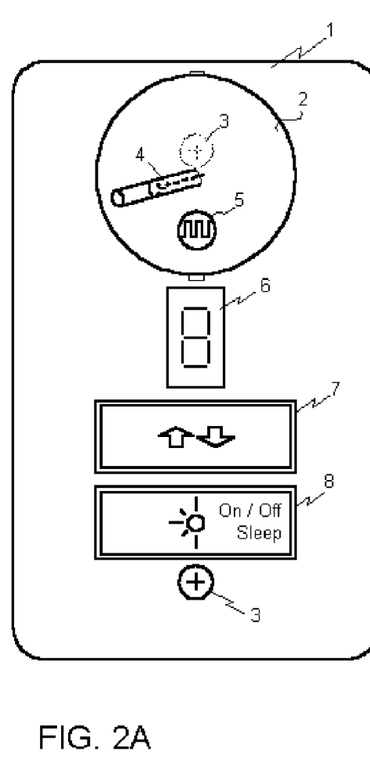
FIG. 2A shows the front view of the OCCS consisting of: 1_The cover plate; 2_The removable dome shape Fresnel lens that covers the vision-restricted PIR sensor, the Photo sensor and the screw; 3_The screw; 4_The adjustable vision-restricted PIR sensor; 5_The Photocell sensor; 6_The digital display; 7_The Counter Up/down soft push button; 8_The OnOff/Sleep soft push button.
Figure 3:
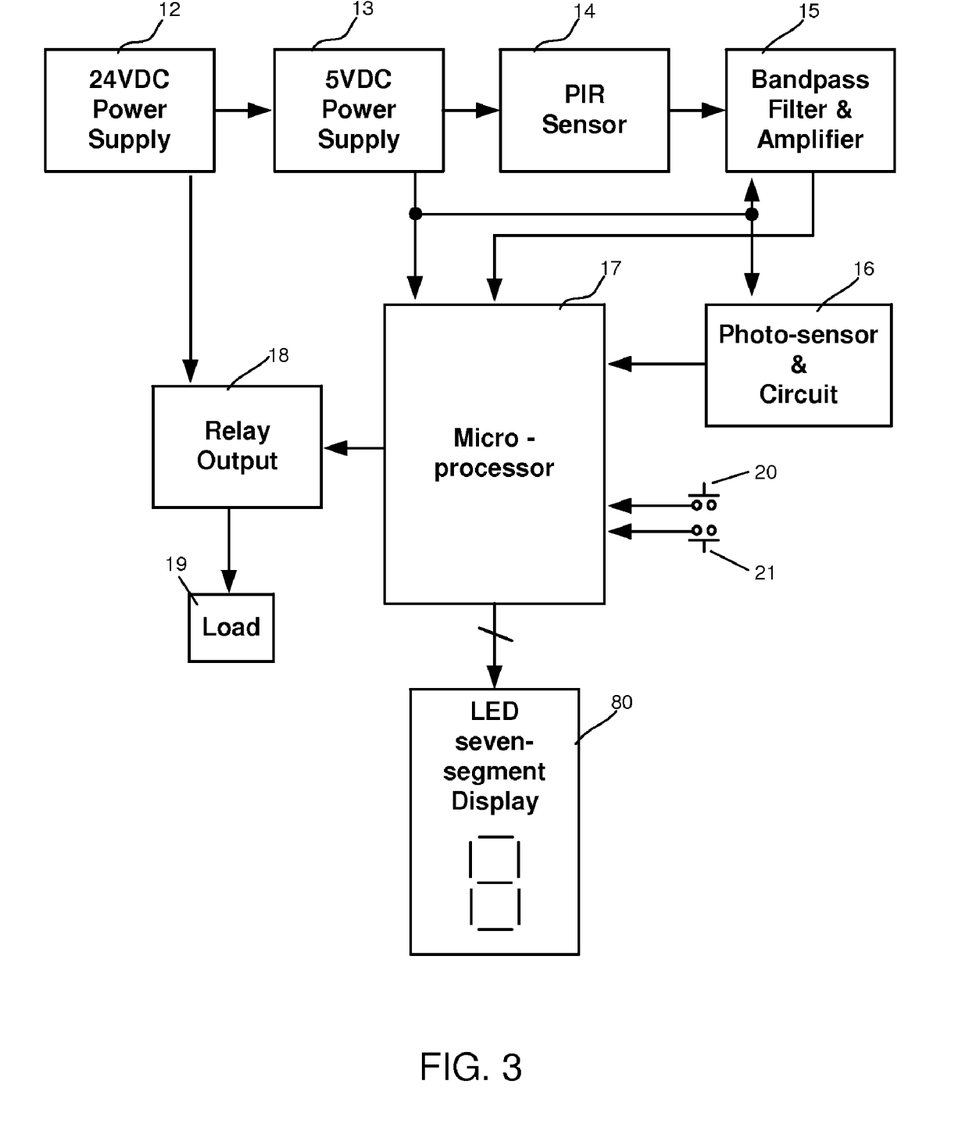
FIG. 3 shows the block diagram of the OCCS circuit consisting of: 12_The 24VDC unregulated power supply that energizes the relay and the 5VDC supply; 13_The regulated 5VDC power supply that provides power for electronic components; 14_The PIR sensor; 15_The PIR amplifier with band-pass filter; 16_The photocell sensor circuit; 17_The microprocessor chip; 18_The relay to drive electrical load; 80_The seven-segment LED display; 19_The electrical load; 20_The OnOff/Sleep soft touch push button; 21_The Counter Up/Down soft touch push button.

As shown in the FIG. 3, the present invention Occupant Counter Control Switch, OCCS for short, is provided with a PIR motion sensor 14 to detect heat, infrared energy, from human body moving across the sensor. The PIR sensor is powered by a regulated 5VDC 13, which is supplied by an unregulated 24VDC 12. The signal of the PIR sensor is, unique to each of the two directions of a person entering or exiting the room (see FIG. 4), amplified and filtered by U2 with the RC combinational network R10, R11, C5, C6, and C7 shown in the FIG. 6. U2 is bias at 2.5VDC and is in current amplification mode. The amplified PIR signal is then fed to the A/D, analog to digital converter, of the microprocessor U4 in FIG. 6 for further process for counting and thereby controlling the relay to drive electrical appliances. The embedded program, based on the algorithm shown in FIG. 7 that will be clarified later, directs the microprocessor from receiving and analyzing inputs to appropriately timing and logically sequencing to ensure the proper arranging and selecting of events that lead to the right outcome among the outputs. The microprocessor provides seven outputs to drive seven LED segments of the digital display 80 (see FIG. 3 and FIG. 6). Each segment of the digital display is blinked at a time and the embedded program controls the sequence of blinking rapidly such that the display of the entire digit appears solidly illuminated. The Photo sensor circuit 16 (see FIG. 3), also powered by 5VDC, feeds its signal to another A/D input of the microprocessor to prevent the relay from closing if adequate ambient light is detected. The relay 18, driven by an operational amplifier that powered by 24VDC, receives command from the microprocessor to turn on or off the electrical load. The push button 20, tied to an input of the microprocessor, serves as a manual on off toggle switch when it is released after being pressed and held in shorter than half a second, and serves to activate sleep mode when it is released after being pressed and held in longer than half a second. The push button 20 also servers as a manual single count up from zero to one upon it is released after being pressed and held in less than half a second when the count or the shown display is at zero; this is a convenient feature that allows the user to turn on the lights by pressing any of the buttons when the count is at zero. The push button 21, tied to another input of the microprocessor, is for manually adjusting counting up or down. The counter counts up when the button 21 is released after being pressed and held in longer than half a second. The counter counts down when the button 21 is released after being pressed and held in less than half a second. The push buttons are assembled with the overlaid rectangular plastic pieces whose areas are big enough to allow easily getting pressed (see FIG. 2A).

When the two buttons together are pressed and released, the system enters into adjusting mode and the display shows a letter "A" to mean adjusting. The letter "A" will soon change into a digit, the level, of adjusting when one of the buttons is pressed. There are nine levels in each adjusting mode. In PIR sensor adjusting mode, the push button 20 is for increasing or decreasing the sensitivity of the PIR sensor to extend or reduce the detection range respectively. To decrease the sensitivity, the button 20 must be pressed and held in longer than half a second. To increase the sensitivity, the button 20 must be pressed and held in shorter than half a second. In lighting demand adjusting mode, the push button 21 is for changing the photo sensor reference, that is called the lighting demand level, which is compared with the photo sensor digitized voltage. When released after being pressed and held in longer than half a second, the button 21 increases the lighting demand level. If the lighting demand level is adjusted higher than that of the current ambient light and the count is greater than zero and the said relay has not been manually turned off, the lights are allowed to automatically turn on. To decrease the lighting demand level, the button 21 is pressed and held in less than half a second. If no more pressing on any button for about one minute or the two buttons are pressed and released together, the system will get out of the adjusting mode and resume its normal operation.

Figure 4A:
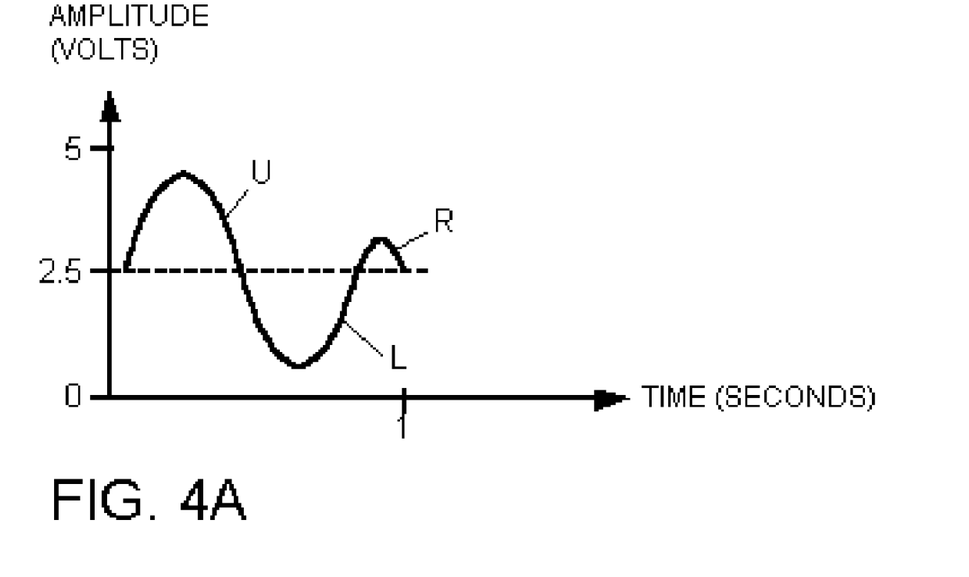
FIGS. 4A and 4B show the amplitude in volts versus time in seconds of the Enter waveform and Exit waveform of the PIR sensor signals consisting of: U_the upper pulse; L_the lower pulse; R_the residual pulse. The pulse widths of these waveforms vary with the walking speed of a person passing through the PIR sensor.
Figure 4B:
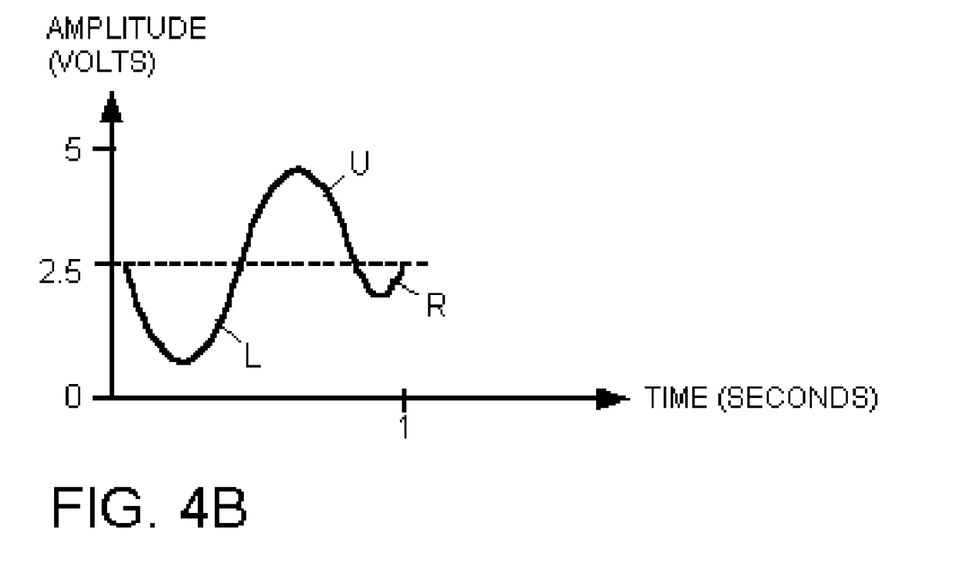
Figure 7:
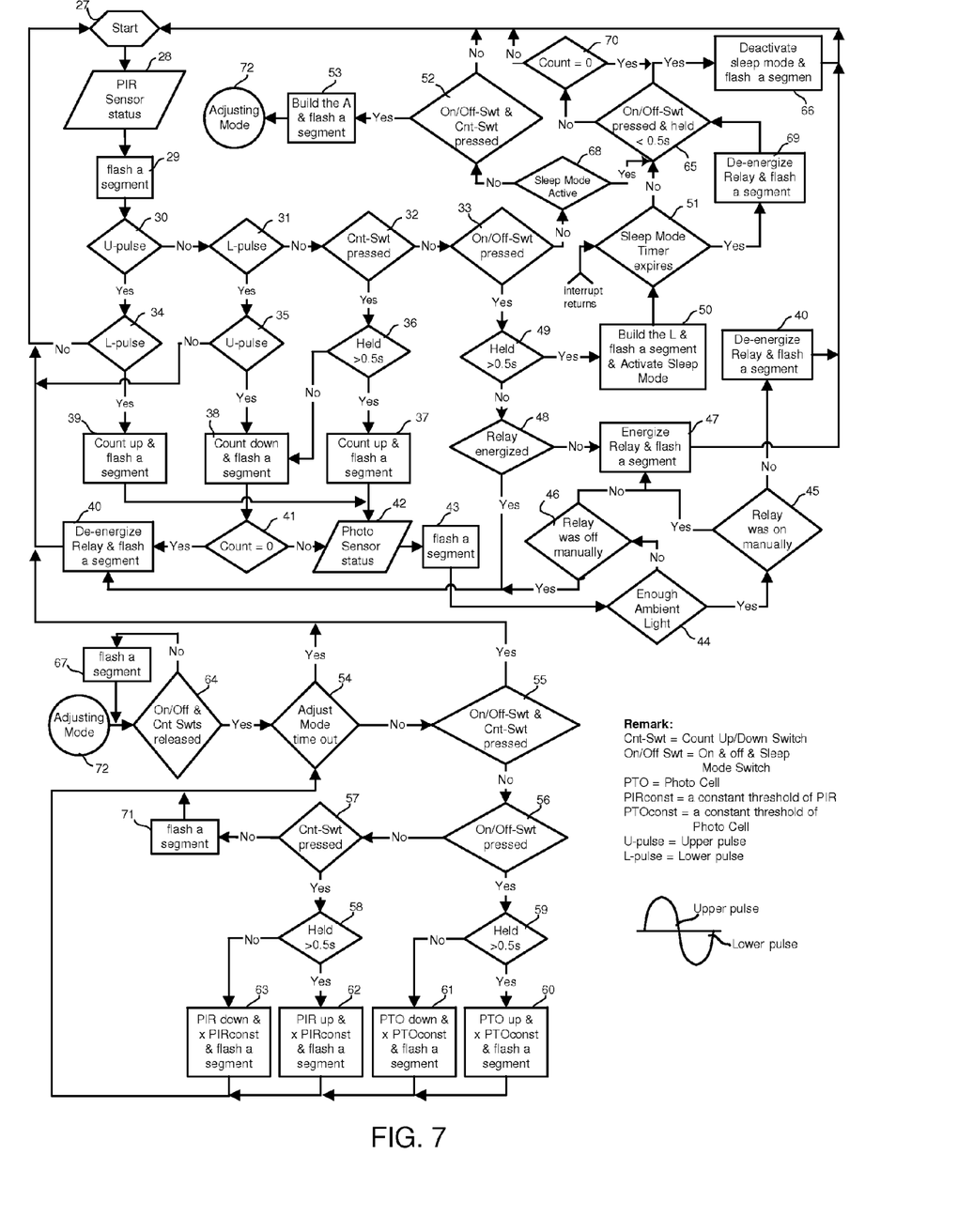
FIG. 7 shows the algorithm of the program embedded in the microprocessor that directs the operation of the Occupant Counter Control Switch. See detail in the Detailed Description

Shown in the FIG. 7 is the control algorithm of the embedded program that directs the said microprocessor to perform its functions. After power up, the microprocessor initializes all values of variables and constants and then stays within the main loop starting at block 27. The microprocessor reads the status of the PIR sensor block 28 and quickly blinks a segment of the displayed digit zero block 29. If the PIR sensor detects a person entering the room, its amplified signal rises above the bias level 2.5V denoted as U-pulse (upper pulse) in block 30. As the person continues passing through the PIR sensor, his/her body infrared energy strikes the other sensor element that causes the signal falling, resulting from the negative charge of the latter element, below 2.5V denoted as L-pulse (lower pulse) in block 34 (also see FIG. 4A). In the case if noise affects the PIR sensor and causes the U-pulse to occur without the immediate following of the L-pulse block 34, the program loops back to start a new cycle at block 27. Noise is usually caused by a person walks near by the sensor. Now if the presence of the L-pulse 34 after the U-pulse 30, counting up takes place block 39 and the microprocessor also quickly blinks another segment of the display. The count now is greater than zero and the program reads the photo sensor status 42 and also quickly blinks another segment of the display block 43. If the photo sensor detects insufficient ambient light 44, then logically the lights or lamps should be turned on, which is true in 47 if the relay was not manually turned off in 46. If the relay was manually turned off in block 46, the lights are not allowed to be on via block 40; another segment is also blinked at this point. On other hand, if enough ambient light is detected in 44, then logically the lights should not be on, which is true in block 40 if the relay was not manually turned on in 45. However, if the relay was manually turned on in 45, the lights must be on by block 47. Another segment of the display is also blinked and the program loops back to start 27 for a new cycle. A similar logic is applied for detecting a person exiting the room, which is when the L-pulse 31 occurs first and the U-pulse 35 immediately follows (also see FIG. 4B). The residue pulses shown in FIGS. 4A and 4B are ignored as noises. The counter now is counting down in block 38 and following is another blink of the segment. If the count reaches zero in block 41, the lights are immediately turned off by block 40 and the program starts another new cycle. If the count is still greater than zero, the outcome of the lights is dependent on the combination of ambient light and manual control the relay via the On/off toggle push button just as described above.

If no activities from the PIR sensor after start of a cycle, the program checks the count push button, Cnt-Swt in block 32. If the count button is pushed and held in longer than half a second in block 36, the counter counts up in block 37 as the count button is released and another segment of the display is also blinked. The counter now is greater than zero and the program follows the same path from block 42 as described above to determine the outcome of the lights. The counter counts down in 38 if the count button is released after held in shorter than half a second. The count value is then checked in 41 to determine the status of the lights on or off by following the same path of blocks 40 or 42 just as described above. If no activities from the count button in block 32, the program goes on to check the status of the On/off-Swt push button in block 33. If the button is released after pushed and held in less than half a second in block 49, the relay is energized in 47 to turn on the lights if the relay has not been energized before in block 48. If the relay has been energized in block 48, the lights are turned off via block 40 of de-energizing the relay. Thus, when the On/off button in block 33 is pushed and held in less than half a second, it serves as a toggle switch to turn the lights on or off. On other hand, if the same button in 33 is held in longer than half a second, the program triggers the sleep mode and displays the letter "L" in 50. Letter "L" stands for "sleep". The sleep mode is a timer interrupt mechanism that keeps the lights on a certain period of time, preset about three minutes, to allow the user getting prepare before getting into the bed. The interrupt mechanism causes the program frequently interrupts what it is doing to check on the timer in block 51 and then returns to where it interrupted to continue its routine. When the timer expires in block 51, the lights are automatically switched off by block 69 to let the user sleeps. The sleep mode is either deactivated in block 66 by the On/off button in block 65 is pressed and held in less than half a second or by the count reaches zero in block 70 as the last person exits the room.

If the program finds no activities of the On/off button in block 33, it moves on to check the Sleep Mode in block 68. If the Sleep Mode is active, the lights have been off, the program checks on the On/off button again in block 65 and continues on as described above. If the Sleep Mode is not active in 68, the program checks on both buttons, the On/off-Swt and the Cnt-Swt, in block 52. If they both together are pressed, the program steers into adjusting mode and builds and blinks a segment of the letter "A" in 53 to indicate the system is in adjusting mode. Each segment of the letter "A" is rapidly blinked in 67 until the two buttons are released. The letter "A" will soon change into a digit that reflects the level of adjustment as one of the buttons is pressed. As the two buttons are released in 64, the adjusting mode timing is set and is checked in 54. If no more activities of the two buttons are detected until the adjusting mode time out, about one minute, in 54, or the two buttons together are pressed again in 55 before adjusting mode time out, the program will get out of the adjusting mode and restart a new cycle. Once in the adjusting mode, before adjusting mode time out, if the On/off button in 56 is pressed and released after held in longer than half a second in 59, the photo sensor reference is increased. There are nine levels of adjustment for the photo sensor reference. A segment of the digit, the level, of adjustment is blinked and a constant PTOconst is multiplied with this adjusted level in 60 to form a photo sensor reference product that will be compared with the ambient light level in the block 44. The ambient light level is the voltage from the divider network formed by the photo sensor Pcell and R12 in the FIG. 6. This voltage is digitized into counts and is compared with the photo sensor reference. The photo sensor reference is also called the lighting demand level. If the lighting demand level is higher than the level of the current ambient light in the room, the lights are allowed to automatically turn on after a change in count, that means when there is a person entering or exiting the room. Once the lights are on, the photo sensor is disabled to prevent the on and off oscillation of the lights. If the On/off button is pressed in 56 and released after held in less than half a second in 59, the photo sensor reference or the lighting demand level is decreased in 61 and the program prevents the lights from automatically turning on if the lighting demand level is lower than the level of ambient light. Like the process in 60, constant multiplication and blinking a digital segment take place in 61.

If the program detects the count, Cnt-Swt, button is pressed in 57 while in the adjusting mode, the PIR noise immunity is adjusted. There are also nine levels of adjustment of the PIR noise immunity. When the count button is pressed and held in longer than half a second in 58, the PIR noise immunity is increased in 62. The noise immunity level is multiplied with the PIRconst constant to form a product that determines the signal sensitivity of the PIR sensor. A segment of the digit of the noise immunity level is also blinked in 62. If the count button is held in less than half a second in 58, the PIR noise immunity is decreased in 63 and the same process of constant multiplication and blink a segment also takes place. The PIR noise immunity is helpful in setting the detection range of the PIR. The lower the noise immunity level, the farther the detection range is, and vise versa. If no activity of the two push buttons is detected, the program keeps blinking sequentially each segment of the digital display in block 71 until the adjusting mode timer in 54 expires. After the processing 60 or 61 or 62 or 63, the program checks the adjusting mode timing 54. If the time is up, the program jumps out of the adjusting mode and restarts a new cycle. The adjusting mode timing will be set for one minute. The user can also terminate the adjusting mode by pressing both buttons together as mentioned in the block 55.

Figure 2B:
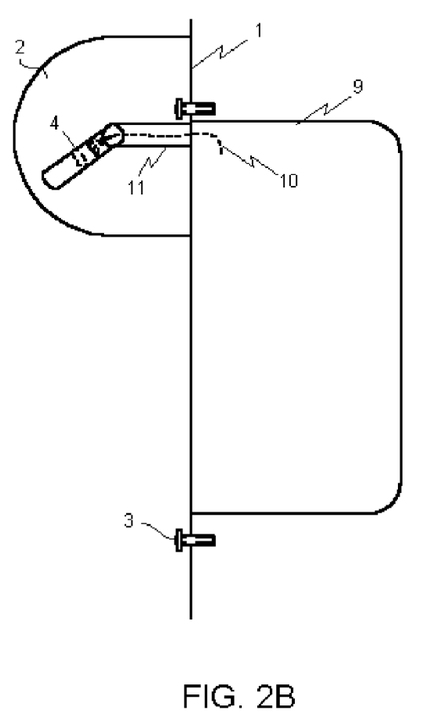
FIG. 2B shows the side view of the OCCS with additional item 9, the electrical enclosure piggybacks to the cover plate; item 10, the PIR signal wires; item 11, the pivot-join supporter that, can be rotated 360 degree along its shaft, supports the vision-restricted PIR sensor.
Figure 5B:
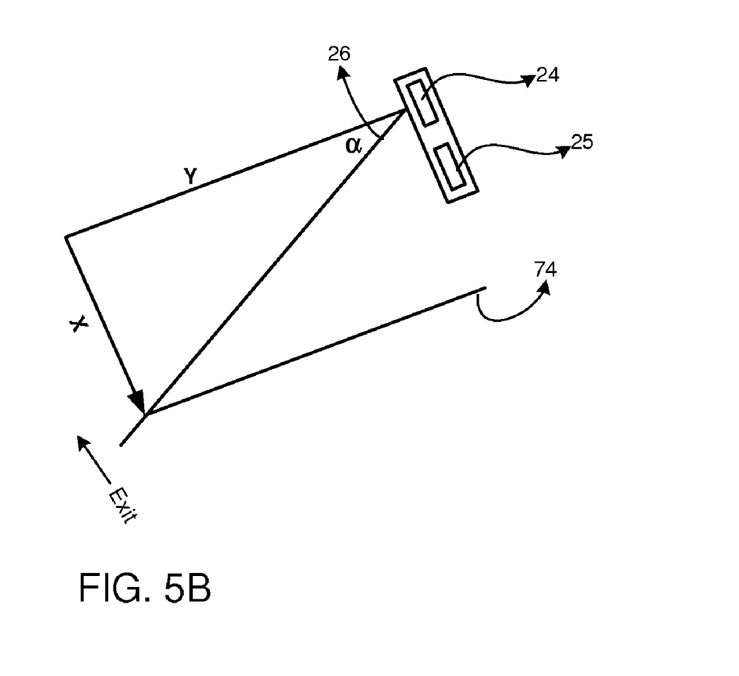
FIG. 5B shows the defined vision angle of the vision restricted PIR sensor. The figure consists of: 74_the restrict-vision tube length Y; 24_the Exit element sensor; 25_the Enter element sensor; 26_the vision angle Alpha that is defined as $Tan(alpha)=X/Y$. Where Y is the length of the restrict-vision tube and X is the radius of the tube plus 1 mm. Length Y is proportional to the PIR signal gain.
Figure 6:
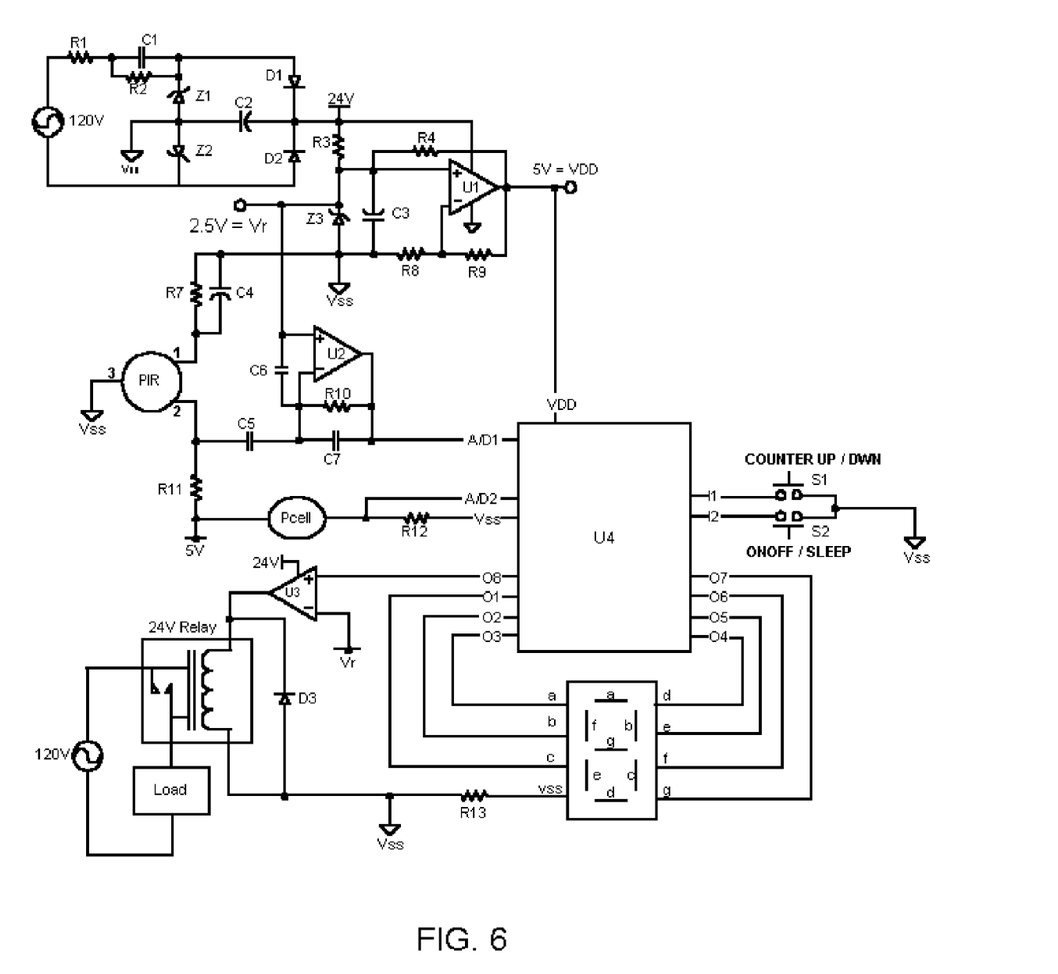
FIG. 6 shows the circuit diagram of the Occupant Counter Control Switch.

What I claim as my invention is:

1. A smart switch system called Occupant Counter Control Switch, or OCCS, automatically turning on and off electrical appliances by intelligently keeping track of and displaying the number of occupants in a room via the process of counting up or counting down when detecting a person entering or leaving the room respectively (see FIG. 1), the said OCCS comprises of:

a Vision-Restricted PIR Motion Detector for generating two distinctive signals that correspond to the two different directions of a person entering or exiting the room (see FIG. 5 and FIG. 4);

a removable dome shape clear plastic or Fresnel lens for covering and protecting the said Vision-Restricted PIR Motion Detector from accidentally getting contacted and changed its pre-aimed direction (see FIG. 2);

a photo sensor for detecting ambient light (see FIG. 3 or FIG. f);

a digital display controlled by a program that sequentially and rapidly flashes each segment at a time for displaying the figure of the count value that indicating number of occupants in the room, or displaying a scale value of tuning processes, or displaying a letter "L" indicating the system is in sleep mode, or a letter "A" indicating the system is in adjusting mode (see FIG. 2);

two soft touch push buttons for manually controlling a relay, driving the electrical load, and for serving other functions (see FIG. 2);

wherein said the two push buttons controlled by the said program makes up nine combinational function keys:

an adjusting count up key when a Up/Down Counter button is pressed and held in longer than half of a second, an adjusting count down key when the Up/Down Counter button is pressed and held in shorter than half of a second, a manually toggling on key to close the said relay to turn on the lights when a OnOff/Sleep button is pressed and held in less than half of a second while the lights have been off, a manually toggling off key to open the said relay to turn off the lights when the OnOff/Sleep button is pressed and held in less than half of a second while the lights have been on, an activating sleep mode key when the OnOff/Sleep button is pressed and held in longer than half of a second, when the two buttons are pressed and then released together the first time allowing accessing to other four remaining function keys, typically a key to increase the noise immunity of the said PIR signal when the Up/Down Counter button is pressed and held in more than half of a second, a key to decrease the noise immunity of the said PIR signal when the Up/Down Counter button is pressed and held in less than half of a second, a key to raise the light demanding level when the OnOff/Sleep button is pressed and held in longer than half of a second, a key to lower the light demanding level when the OnOff/Sleep button is pressed and held in shorter than half of a second, finally the two buttons are pressed and released together the second time, or no further pressing on any button for one minute, the adjusting mode is terminated and the system resumes its normal operation;

an amplifier circuit with band-pass filter for filtering 60 to 120 Hz noises and amplifying the signal of the said PIR sensor (see FIG. 6);

a delicate and complicated program embedded in a microprocessor IC chip as a central processing of all inputs and outputs of the said smart switch.

Figure 8:
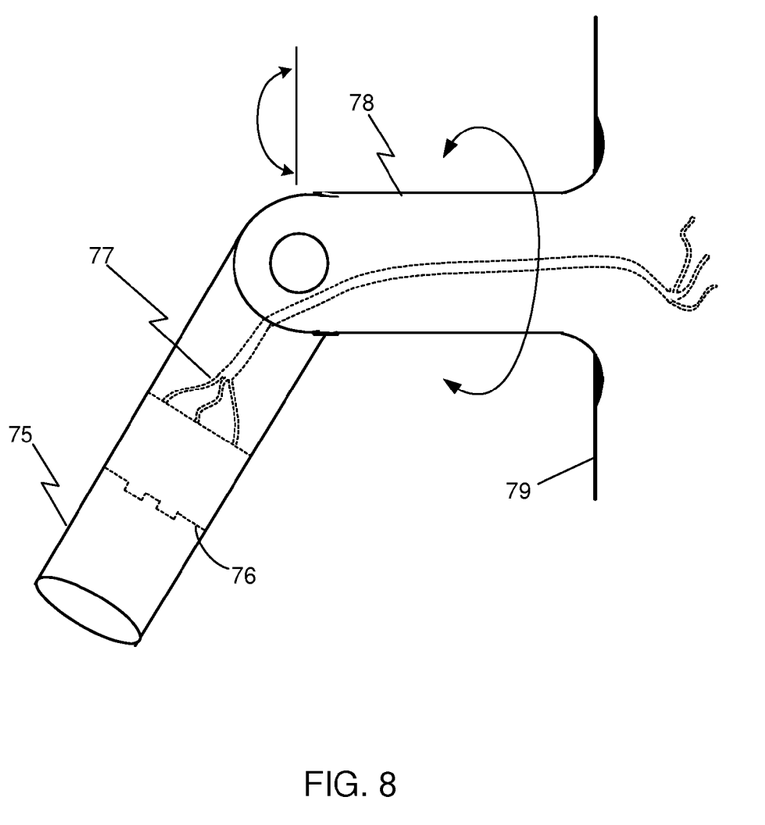
FIG. 8 shows the Vision-Restricted PIR Sensor mounted on the pivot-join supporter. The figure consists of: 75_the restricting PIR sensor vision tube; 76_the encapsulated PIR sensor; 77_the PIR signal wires; 78_the Pivot-join supporter; 79_the Cover Plate. The restricting vision tube and the PIR sensor as a whole can swing 180 degree on the Pivot-join supporter. The Pivot-join supporter is connected perpendicular to the Cover Plate and can be rotated around its axis but limited to 360 degree to prevent the PIR signal wires from excessively twisting.

2. The OCCS or smart switch as claimed in claim 1, wherein said the Vision-Restricted PIR Motion Detector is further comprises of:

a cylinder tube encapsulates a dual-element PIR sensor to form a vision-restricted sensor for narrowing the detection angle of the said PIR sensor (see FIG. 5A); a pivot-join supporter allows the said Vision-Restricted PIR Motion Detector to be adjusted to point at any direction (see FIG. 8) so that the OCCS can be mounted at the right side or left side of the entrance of a room or can be aimed down to detect children.

3. The OCCS or smart switch as claimed in claim 1, wherein said the micro-processor is an IC chip that comprises of an output tied to a relay or a triac to drive electrical appliances, other seven outputs to drive seven LED segments of the said digital display, two analog to digital converter inputs to digitize an amplified signal of the said PIR sensor for counting process and to digitize the signal of the ambient light from the said photo sensor for co-controlling the said relay, and the other two inputs tied to the said two push buttons (see FIG. 3 or FIG. 6).

* * * * *